United States Patent [19]
Brown

[11] Patent Number: 5,622,216
[45] Date of Patent: Apr. 22, 1997

[54] METHOD AND APPARATUS FOR METAL SOLID FREEFORM FABRICATION UTILIZING PARTIALLY SOLIDIFIED METAL SLURRY

[76] Inventor: Stuart B. Brown, 77C Mount Vernon St., Somerville, Mass. 02145

[21] Appl. No.: 343,118

[22] Filed: Nov. 22, 1994

[51] Int. Cl.⁶ .................................................. B22C 9/08
[52] U.S. Cl. .......................................... 164/71.1; 164/900
[58] Field of Search ........................... 164/900, 468, 164/504, 71.1, 46

[56] References Cited

U.S. PATENT DOCUMENTS

| | | | |
|---|---|---|---|
| 3,902,544 | 9/1975 | Flemings et al. | 164/900 |
| 4,373,950 | 2/1983 | Shingu et al. | 164/900 |
| 4,958,678 | 9/1990 | Kawamura et al. | 164/900 |
| 5,121,329 | 6/1992 | Crump . | |
| 5,144,998 | 9/1992 | Hirai et al. | 164/900 |
| 5,343,926 | 9/1994 | Cheskis et al. | 164/46 |

OTHER PUBLICATIONS

"Structure and Properties of Thiocast Steels" by K.P. Young et al. Metals Technology 4, 1979.
"A World Wide Assessment of Rapid Prototyping Technologies," RF Aubin United Technologies Research Center Report No. 94–13, dated Jan. 1994, 29 pages.
H.L. Marcus and D.L. Bourell, "Solid Freeform Fabrication," *Advanced Materials & Processes*, dated Sep. 1993, pp. 28–31 and 34–35.
S.B. Brown and M.C. Flemings, "Net–Shape Forming Via Semi–Solid Processing," *Advanced Materials & Processes*, dated Jan. 1993, pp. 36–40.

J.W. Comb and W.R. Priedman, Stratasys, Inc., "Control Parameters and Material Selection Criteria for Rapid Prototyping Systems," copyright date 1993, pp. 86–93.
Stratasys, Inc., "Rapid Prototyping Using FDM: A Fast, Precise, Safe Technology," paper from the Solid Freeform Fabrication Symposium, Aug. 3–5, 1992, pp. 301–308.
R.E. Reed–Hill and R. Abbaschian, *Physical Metallurgy Principles*, PWS–Kent Publishing Company, 1992, pp. 325–349.
M.E. Orme, K. Willis and J. Courter, Department of Mechanical and Aerospace Engineering, University of California—Irvine, "The Development of Rapid Prototyping of Metallic Components Via Ultra–Uniform Droplet Deposition," undated, pp. 27–36.
J.W. Comb, W.R. Priedman and P.W. Turley, Stratasys, Inc., "Control Parameters and Material Selection Criteria and Fused Deposition Modeling," undated, pp. 163–170.

*Primary Examiner*—Jack W. Lavinder
*Assistant Examiner*—Randolph S. Herrick
*Attorney, Agent, or Firm*—Choate, Hall & Stewart

[57] ABSTRACT

Disclosed is a method and apparatus for rapidly producing a metal component from partially solidified metal slurry. A source of metal alloy slurry is provided and maintained under conditions to maintain the slurry state, for example by shearing at a temperature between a liquidus and solidus thereof. The slurry is dispensed through a source nozzle and deposited upon a substrate or upon previously dispensed slurry in a predetermined, controlled manner to produce a component of desired geometry. The substrate may be planar or contoured and may comprise an element of the component being produced. A temperature, pressure or chemical composition controlled deposition environment may be provided to facilitate producing a component having desired characteristics.

42 Claims, 4 Drawing Sheets

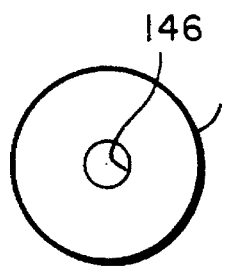
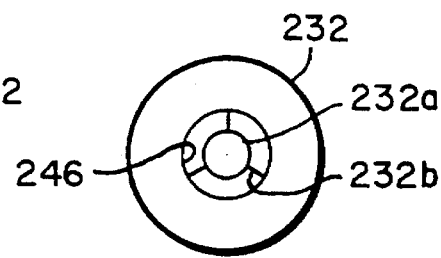
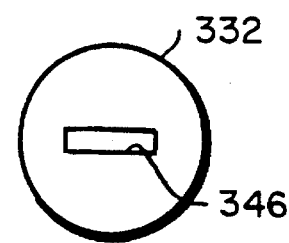
FIG. 7A     FIG. 7B     FIG. 7C
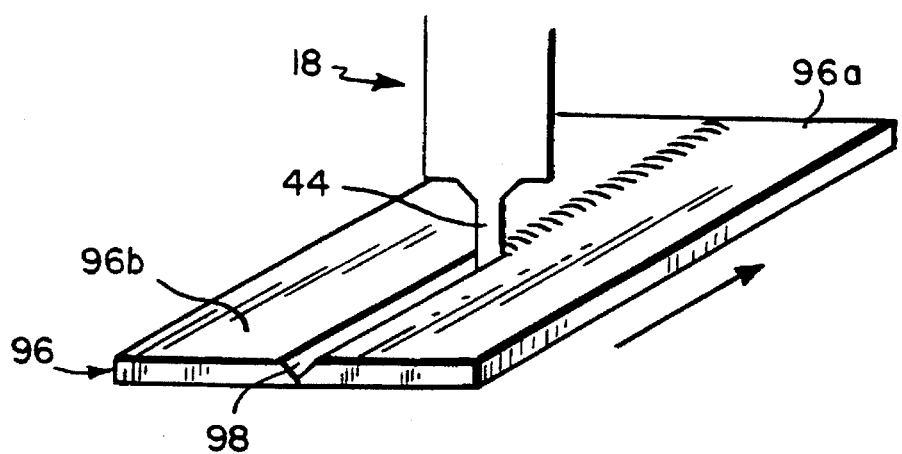
FIG. 8

METHOD AND APPARATUS FOR METAL SOLID FREEFORM FABRICATION UTILIZING PARTIALLY SOLIDIFIED METAL SLURRY

TECHNICAL FIELD

The present invention relates generally to component fabrication and more specifically to a method and apparatus for producing a metallic component through controlled deposition of a partially solidified metal slurry.

BACKGROUND INFORMATION

Numerous methods are known for producing metallic components for experimental or productive uses. For example, to produce an exhaust valve designed for use in an internal combustion engine, a typical manufacturing sequence may entail casting a machining blank by pouring molten metal alloy into a uniquely designed casting mold. Alternatively, a preformed metal slug may be alternately heated and forged using a series of progressive forming forging dies to produce a near net-shape forging. The forging or casting may then undergo numerous machining and heat treating steps necessitated by both the close geometric tolerances required and the harsh, high temperature, high stress operating conditions experienced in the engine.

While such manufacturing sequences may be economically justified for high volume production of components, small lot size or experimental quantities rarely justify the expense and time required to produce costly forging dies or unique casting molds. Often, where only a few components are required, or where the design of the components is changing iteratively in a design development cycle, the components are machined directly from blocks of metal in which relatively large quantities of excess material are removed through machining. Depending on the complexity of the component, this method is also often quite expensive, requiring both development of specialized tooling for fixturing the component during the machining cycles and highly skilled machinists for operating the requisite machine tools. Additionally, the fully machined component may resemble the desired design only insofar as certain features thereof which are required to establish geometric fit and function. Other important features, such as chemical composition and weight minimization may be deemed of secondary importance or too costly to achieve for experimental quantities, especially if the material is difficult to machine.

There exists a need to be able to produce metallic components rapidly and at reasonable cost in lot sizes as small as a single, unique component. Techniques of rapid prototyping, conventionally referred to as solid freeform fabrication (SFF), are known and systems are commercially available capable of producing prototypes which geometrically mimic a desired component, to varying degrees of geometric tolerance. Such techniques, including stereolithography, selective laser sintering, solid ground curing, three-dimensional printing, fused deposition modeling and recursive mask and deposit process, typically build a prototype by layers under computer control, using resins, ceramic or metal powders, photopolymers, coated paper, or thermoplastics.

While these techniques produce a geometric mimic of a desired component, potentially useful for checking for interference in assembly and for proper mating with abutting components, the prototypes are typically unsuitable for static or dynamic use under operational loads beyond the capability of the constituent material. For the case of the exhaust valve discussed above, it is contemplated that no conventional SFF technique could produce a component suitable for use in a running engine. For example, resin, paper and thermoplastic prototypes clearly lack thermal capability, and porosity severely compromises the structural integrity of prototypes formed from sintered metal or ceramic powders. Systems which purport to be capable of processing liquid metals are contemplated to have volumetric deposition rates so low, due to the inherent geometric instability of liquid metal and the resultant need for substantially instantaneous solidification, as to be altogether impractical for producing components of any substantial size within a reasonable time period, if at all.

Partially solidified metal slurries are included in a class of materials typically retorted to as semi-solid materials (SSMs) which have been advantageously employed in the production of net-shape components by injection molding. These SSMs are typically formed in billets and subsequently reheated to the semi-solid state for processing; however, rapid cooling and consequent premature solidification of the slurry in a mold may result in incomplete formation of a desired component. Relatively high shot velocities have been demonstrated to ameliorate the problem with some low melting temperature commercial alloys. A discussion of the technology, as applied generally to injection molding, is presented in "Net-Shape Forming Via Semi-Solid Processing," by S. B. Brown and M. C. Flemings, *Advanced Materials & Processes*, 1/93, pp. 36–40, the disclosure of which is herein incorporated by reference.

SUMMARY OF THE INVENTION

A method and apparatus for rapidly producing a component from partially solidified metal slurry is disclosed. A source of partially solidified metal slurry is provided, for example, by reheating a billet of solidified alloy or cooling molten alloy while shearing, the slurry being maintained at a temperature between the liquidus and solidus thereof, in either case. The slurry is dispensed from a nozzle of the source onto a substrate in a controlled manner whereupon the dispensed slurry substantially retains its geometric configuration while it cools and fully solidifies. By controlling relative motion between the nozzle and the substrate and the flow resistance or apparent viscosity of the dispensed slurry, among other parameters, the slurry may be deposited solely upon the substrate, in a predetermined manner, or upon the substrate and previously dispensed slurry to produce a desired component. The substrate may be planar or contoured and may comprise an element of the component being produced. Further, the substrate may be of the same material as the dispensed slurry or a dissimilar material.

The method and apparatus may be used to produce a fully dense component having predetermined external contours, predetermined internal contours or a combination thereof. Depending on the particular application, the component may be used in the as-produced state or may be subsequently machined, heat treated or otherwise processed, resulting in a finished component suitable for operational testing or end use.

The method and apparatus are applicable to a wide range of metal alloys, intermetallic compositions, for example nickel aluminides, as well as material alloys such as alumina and silica. Substantially all alloy compositions having a temperature range between a liquidus and solidus thereof may be advantageously processed according to the teachings of this invention. The method and apparatus are also applicable to alloys and materials without a freezing range, such as pure metals and eutectic composition alloys, wherein heat flux is controlled at the melting point to produce a partially solidified metal slurry having a desired apparent viscosity. These alloys, pure metals and compositions may include additives, such as ceramic particles or fibers or other particulates. Additionally, a deposition environment can be provided in which temperature, chemical composition, absolute pressure or other parameters are controlled in a predetermined manner to produce a component having desired characteristics, especially where one or more depositions of slurry occur on previously dispensed slurry.

BRIEF DESCRIPTION OF DRAWINGS

The novel features believed characteristic of the invention are set forth and differentiated in the appended claims. The invention in accordance with preferred and exemplary embodiments, together with further advantages thereof, is more particularly described in the following detailed description taken in conjunction with the accompanying drawings in which:

FIGS. 7A, 7B and 7C are schematic end views of alternate exemplary embodiments of a source nozzle taken along line 7—7 in FIG. 3; and FIG. 8 is a schematic, perspective view of another component produced according to yet another method of the present invention represented by a joining process.

MODE(S) FOR CARRYING OUT THE INVENTION

Figure 1:
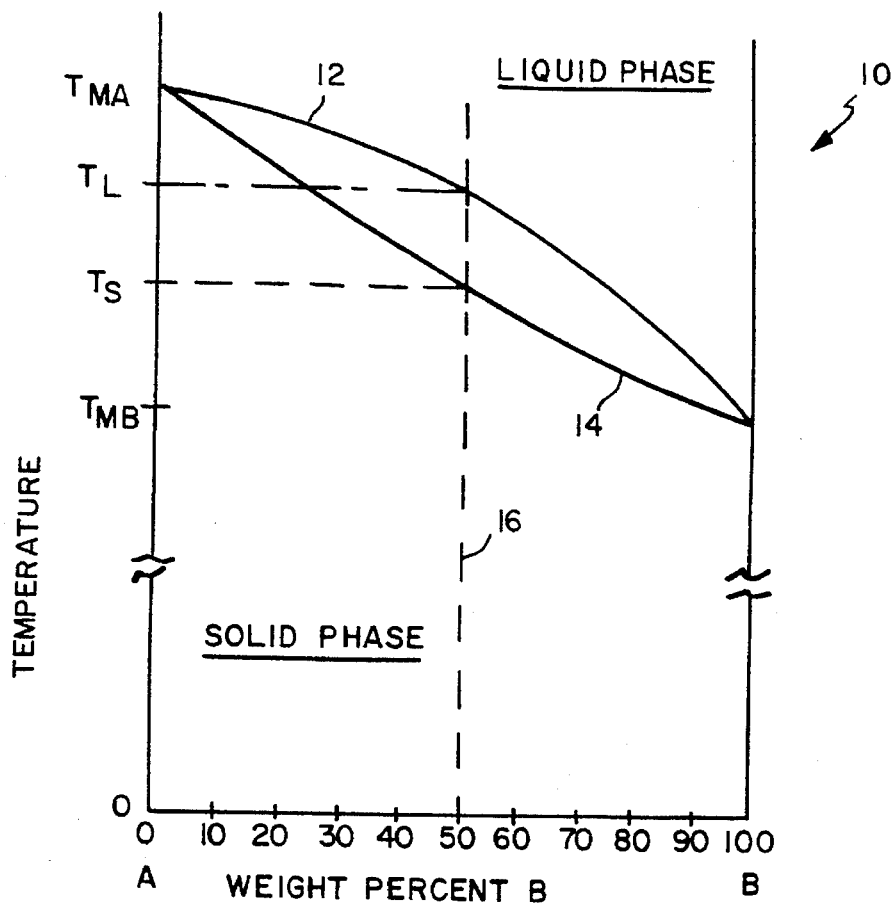
FIG. 1 is a schematic, simple binary phase diagram for a metal alloy.

Depicted in FIG. 1 is a schematic binary phase diagram 10 of temperature versus weight percent of elements A and B for a simple metal alloy system of the type suitable for use in the practice of the present invention. As conventionally known, at temperatures above the liquidus curve 12 for a given alloy composition, only liquid phase can exist in equilibrium. Similarly, at temperatures below the solidus curve 14, solely solid phase can exist. Therebetween, both solid and liquid phases coexist. The percent solid, percent liquid and compositions thereof in this two phase region may be calculated conventionally by application of the lever rule.

As is readily apparent from the phase diagram 10, pure element A melts at a single temperature, $T_{MA}$, and pure element B melts at a lower, single temperature, $T_{MB}$. Such is not the case however for the alloy combination of elements A and B. For example, for a given alloy comprising 50% element A by weight and 50% element B by weight, as designated by dash line 16, the alloy is a homogeneous liquid phase at temperatures greater than $T_L$ and a single solid-solution phase at temperatures less than $T_S$. The alloy is dual phase between temperatures $T_L$ and $T_S$, the temperature range being conventionally referred to as the equilibrium freezing range of the alloy, where both a liquid phase and a solid phase coexist. Per application of the lever rule, at temperatures within the range approaching $T_L$, the alloy is mostly liquid phase and flows readily, while at temperatures within the range approaching $T_S$, the alloy is mostly solid phase and substantially resistant to flow. It is within this entire range that the present invention operates in the advantageous manner to be described.

While an alloy composition according to the simple binary phase diagram of FIG. 1 will be used to explain exemplary methods and embodiments of the present invention, the production and use of semi-solid materials and partially solidified slurries herewith are not limited to alloys comprising solely two elements. Commercially available alloys may be advantageously utilized which routinely comprise more than two elements, for example ternary, quaternary or more complex alloy systems. The presence of trace elements and impurities within a given alloy composition may depress or elevate the liquidus and/or solidus temperatures as is conventionally known, and therefore may need to be accommodated in controlling the temperature of the alloy as described hereinbelow. In general, any alloy composition having an equilibrium freezing range may be utilized. Typically, the greater the absolute temperature range of the equilibrium freezing range, the more readily the apparent viscosity may be controlled.

Figure 1A:
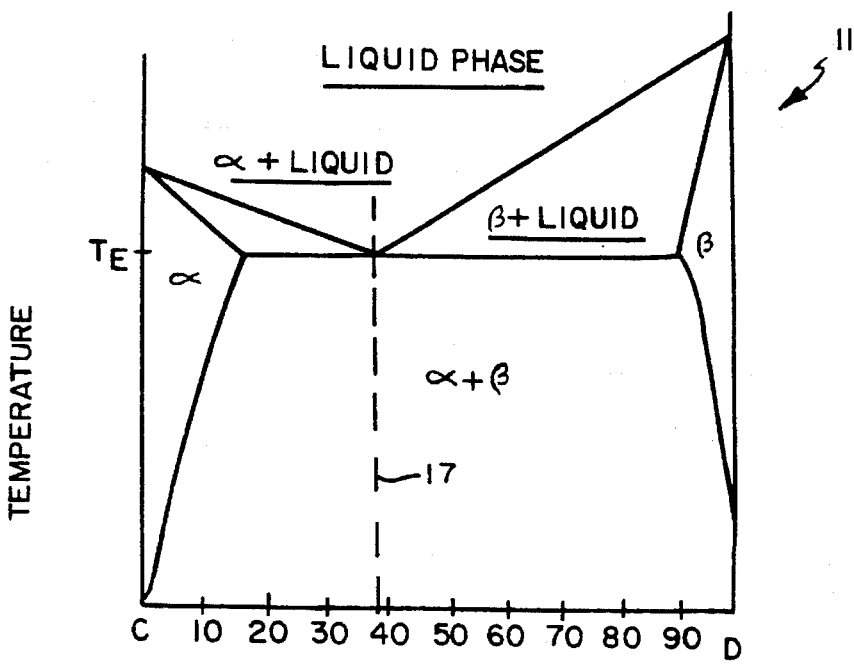
FIG. 1A is a schematic, simple binary phase diagram for an eutectic system metal alloy.

Further, use of the teachings herein is not limited to those alloys having an equilibrium freezing range. For example, FIG. 1A depicts a more complex schematic binary phase diagram 11 for a eutectic system metal alloy of elements C and D. At a eutectic composition, designated by dash line 17, phase transformation between a liquid phase and a solid phase occurs at substantially a discrete, eutectic temperature, $T_E$. This discrete temperature phase transformation behavior is substantially similar to that of a pure single phase metal such as 100% B which undergoes phase transformation at $T_{MB}$, as depicted in FIG. 1. By controlling heat flux at the eutectic temperature or the melting temperature, as the case may be, the teachings of this invention can be applied to the production of components from alloy compositions without a freezing range as well as from pure, single phase metals and materials. For these materials, a semi-solid material may be produced by controlled removal of heat at the transition temperature.

Semi-solid materials may also be produced from given materials by processing under nonequilibrium conditions where the kinetics of solidification and the distribution of constituents permits a semi-solid state where equilibrium conditions would normally predict only a solid or liquid phase. This nonequilibrium semi-solid material may be produced by rapid heating or cooling, for example. The use of all such semi-solid materials with the apparatus and method disclosed herein is considered within the scope of this invention.

Figure 2:
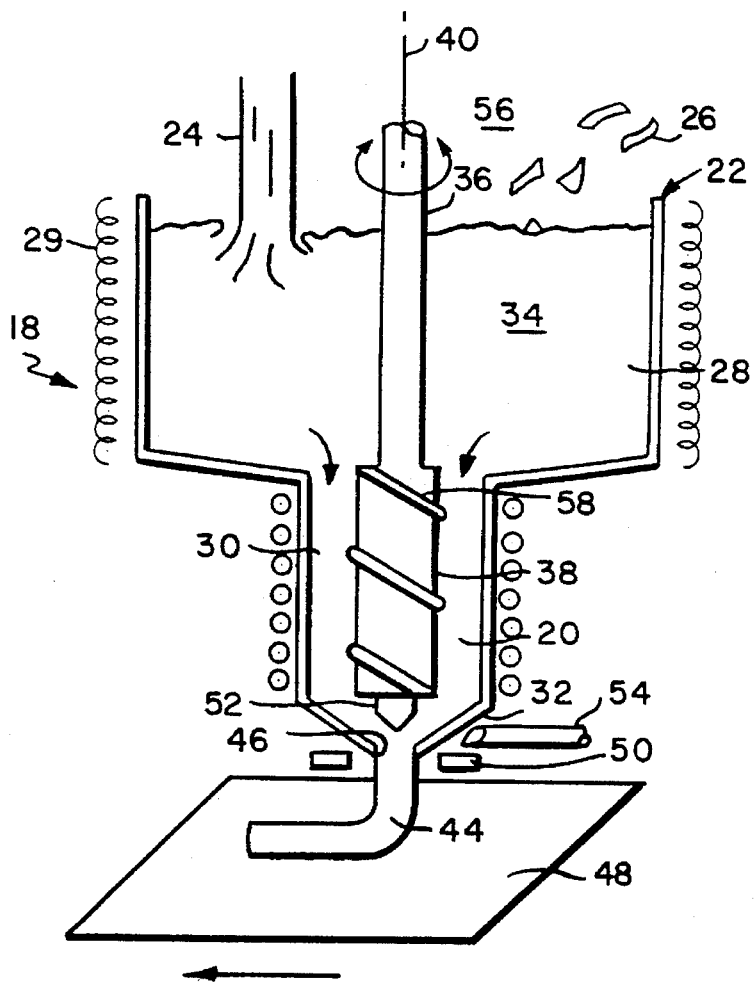
FIG. 2 is a schematic, sectional view of a continuous process slurry source in accordance with an exemplary embodiment of the present invention.

Referring again to the 50% alloy of FIG. 1, FIG. 2 depicts a schematic, sectional view of a continuous process source 18 of partially solidified metal alloy slurry 20 in accordance with an exemplary embodiment of the present invention. Source 18 includes a temperature controlled vessel 22 having a molten zone 28 into which premelted alloy 24 or solid alloy powder or chips 26 are dispensed. Alternatively, pure metals in regulated amounts may be added. The temperature in the molten zone 28 is maintained equal to or greater than the liquidus temperature, $T_L$, so that the alloy contained therein is in an homogeneous liquid phase; however if pure metals are added, the temperature must at least initially be great enough to melt the highest melting point metal to achieve an homogeneous liquid phase. This temperature may be less than the melting point of the metal, as is conventionally known.

Any conventional manner of heating and regulating the temperature of the molten zone 28 may be employed, for example closed loop control systems employing immersion type resistance heaters or vessel wall inductance type, resistance type or gas-fired type heaters with temperature sensing probes (not depicted). A wall type heating system is shown generally at 29. As can be readily appreciated, the vessel 22 should be made of a material suitable for use as a molten metal tundish. For example, stainless steel may be used with molten magnesium; whereas, a higher temperature ceramic such as alumina or zirconia may be employed with iron or nickel alloys because of their higher melting temperatures or with aluminum because of its corrosiveness.

The vessel 22 also includes a transformation zone 30 disposed between and in flow communication with both the molten zone 28 and a source nozzle 32 through which partially solidified slurry 20 is dispensed. The temperature within the transformation zone 30 is maintained within the equilibrium freezing range of the alloy, that is between $T_L$ and $T_S$. For those materials exhibiting a discrete transition temperature, temperature is maintained at the transition temperature with heat flux being controlled to produce the desired apparent viscosity. In a preferred embodiment, the transformation zone 30 has a separate, conventional temperature control system (not depicted), distinct from that of the molten zone 28; however a primary heater may be used to heat the entire vessel 22 on demand of the transformation zone 30 with an additional auxiliary heater provided proximate the molten zone 28 to maintain the molten zone 28 at the desired higher temperature. Depending on the requirements of a particular application and the volumetric flow rate of material through the source 18, cooling apparatus may be desirable to remove thermal energy in the transformation zone 30. This cooling may be through radiation, convection, conduction or a combination thereof. Additionally, alternating heating and cooling of the transformation zone 30 may be desirable to obtain proper control of transformation zone temperature or heat flux as the application may require. With any control scheme, since the temperature in the transformation zone 30 is either less than $T_L$ or at the transition temperature, a solid phase begins to form and molten alloy 34 may be transformed into the desired partially solidified slurry 20.

In the case of the 50% alloy of FIG. 1, as the temperature of the slurry 20 in the transformation zone 30 is reduced from $T_L$ toward $T_S$, the solid fraction, defined as the percent solid phase per unit volume, increases, with a concomitant increased resistance to flow. This resistance to flow, or apparent viscosity, may be markedly reduced by shearing the partially solidified slurry 20 in the transformation zone 30 to reduce the formation of dendritic particles. In a first method depicted in FIG. 2, a rotor 36 extends through the molten zone 28 such that a beater 38 disposed at a distal end thereof is centrally disposed in the transformation zone 30. The rotor 36 is supported for rotation about a central axis 40 thereof and is rotated thereabout, for example by an electric motor (not depicted) to directly mechanically stir and thereby shear the forming slurry 20. In a preferred embodiment, beater 38 may include any of a variety of noncircular configurations suitable for shearing the slurry 20, for example, an octagonal cross-section. The rotor 36 may be made of any material exhibiting sufficient mechanical properties at temperatures experienced within the molten and transformation zones 28, 30, for example stainless steel for magnesium slurries. The rotor 36 may include a facility for internal cooling to prevent melting thereof. Alternatively or additionally, the rotor 36 may be partially or wholly consumable, being of an appropriate material composition such that the process of melting cools the molten alloy 34 facilitating transition to the partially solidified slurry 20.

Alternatively or additionally, shearing of the slurry 20 in the transformation zone 30 may be accomplished by inducing a rotating magnetic field in the slurry 20 employing externally located electromagnetic coils 42. This method may be preferred for shearing of an alloy having a relatively high temperature equilibrium freezing range or transition temperature since undesirable consumption of the rotor 36 by the alloy may thereby be prevented. Other suitable methods for producing rounded solidified particles in the slurry 20 may be employed as well, the desired result being a slurry 20 with rheology suitable for freeform fabrication.

If the slurry 20 were permitted to cool in the equilibrium freezing range while in the transformation zone 30 without the benefit of shearing, slurry 20 would be substantially resistant to flow at solid fractions much less than 50%; whereas, with shearing, the slurry 20 flows freely with solid fractions in the range of 50% to 60%, solely under the influence of gravity, and is subject to flow under the influence of backpressure to upwards of 80% to 90% solid traction. By processing the alloy in this manner, partially solidified slurry 20 produced by the source of FIG. 2, may be produced exhibiting apparent viscosities within the range of about $10^{-2}$ Pascal-seconds to $10^7$ Pascal-seconds, depending upon the solid fraction, primarily controlled by the temperature or heat flux thereof, as the case may be. This range approximately corresponds to viscosities of gear oil or automobile engine oil at the low end and stiff clay or molten glass suitable for blowing at the high end thereof.

The correlation between apparent viscosity and temperature or heat flux is dependent upon the constituent material being processed. For example, for a given composition having a narrow equilibrium freezing range, a change of 1° C. in temperature may double the apparent viscosity exhibited thereby; whereas, for a composition having a broader equilibrium freezing range, exhibited sensitivity to a small temperature change is markedly reduced. In typical freeform fabrication, the solid fraction of the slurry 20 could be maintained such that the characteristic apparent viscosity thereof is around $10^2$ Pascal-seconds, which approximates the viscosity of toothpaste at room temperature. In this state, upon being dispensed through source nozzle 32, dispensed slurry 44 retains the shape of the nozzle orifice 46 and may be deposited upon a substrate 48 in a predetermined, controlled manner as will be discussed in greater detail below. Thereafter, cooling and solidification occur readily without substantial geometric deformation or shrinkage. As stated previously, this method is altogether distinct from techniques for producing components with pure metals and metal alloys solely in the liquid phase. Having apparent viscosities substantially equivalent to the viscosity of water at room temperature, volumetric deposition rates of liquid metals are necessarily relatively minute due to the inherent rheological instability of the liquid phase, making these techniques generally unsuitable for freeform fabrication.

While it is generally desirable to maintain the temperature of the slurry 20 in the transformation zone 30 substantially constant at a predetermined temperature for purposes of process control, fine tailoring of the solid fraction and therefore apparent viscosity and flow characteristic of the dispensed slurry 44 may be effected dynamically through the use of an induction heater 50 disposed proximate the nozzle orifice 46. Uniform bulk heating of the dispensed slurry 44 in this manner is generally preferred over surface heating, for example by means of resistance coils; however, surface heating or cooling may be desirable depending on the particular application and is included within the scope of the invention.

Control of slurry volumetric flow rate through the nozzle 32 may be accomplished in a variety of manners. A baseline flowrate may be established by the apparent viscosity of the slurry 20 and cross-sectional area and configuration of the nozzle orifice 46. Naturally, the flowrate may be increased by reducing the apparent viscosity, for example by increasing temperature or reducing the heat flux in the transformation zone 30, as the case may be, or alternatively by increasing area of the orifice 46. The source 18 could also include more than one nozzle 32 and each nozzle 32 might include more than one orifice 46.

Other elements may be provided to permit regulation of the flowrate in addition to control of these parameters. For example, in an exemplary embodiment, a valve arrangement such as a movable tapered plug 52 may be disposed on the rotor 36, being aligned with the nozzle orifice 46. Translation of solely the plug 52 or alternately the entire rotor 36 along axis 40 may be accomplished to vary the flow area of the orifice 46 or block the orifice 46 to prevent flow therethrough altogether. Such mechanical valve arrangements may be disposed within the transformation zone 30, as depicted, or externally as desired.

While the tapered plug 52 affords infinitely variable control of flowrate within its range of adjustment, if it is desired solely to have the ability to initiate and terminate dispensation of slurry 20 through the nozzle 32, a heat transfer arrangement may be provided to cool and further solidify the slurry 20 in the orifice 46. FIG. 2 depicts a simple air jet 54 arranged to discharge a coolant such as air upon an exterior surface of the nozzle 32. Sufficient cooling of the nozzle 32 solidifies the slurry 20 therein effectively terminating flow therethrough. Depending upon the particular heat transfer characteristics of the source 18, dispensing flow may be reinitiated either through solely terminating coolant discharge or concurrently energizing heater 50. Alternate techniques for temporarily solidifying the slurry 20 in the nozzle 32 include more complex heat transfer arrangements such as double-walled nozzles (not depicted) having coolant circuits disposed therethrough for applications where substantially instantaneous slurry solidification is desirable. Heating circuits may be included if desired.

In addition to the aforementioned techniques available for reducing volumetric flow rate, absolute pressure of a region 56 above the molten alloy 34 may be controlled to either reduce or increase flow rate. By increasing absolute pressure in region 56 above ambient pressure external to the orifice 46, volumetric flow rate through the orifice 46 increases and by sufficiently decreasing absolute pressure in region 56, volumetric flow rate may be reduced or terminated. Of course, static head of the slurry 20 and molten alloy 34 within the source 18 must be accounted for in any pressure balance. Alternatively or additionally, the beater 38 may include a coarse external thread 58 or other pumping feature to facilitate dispensing the slurry 20 through the orifice 46 while the rotor 36 turns in a feed direction. Rotation of the rotor 36 in the opposite direction will tend to reduce flow rate through the orifice 46.

Figure 3:
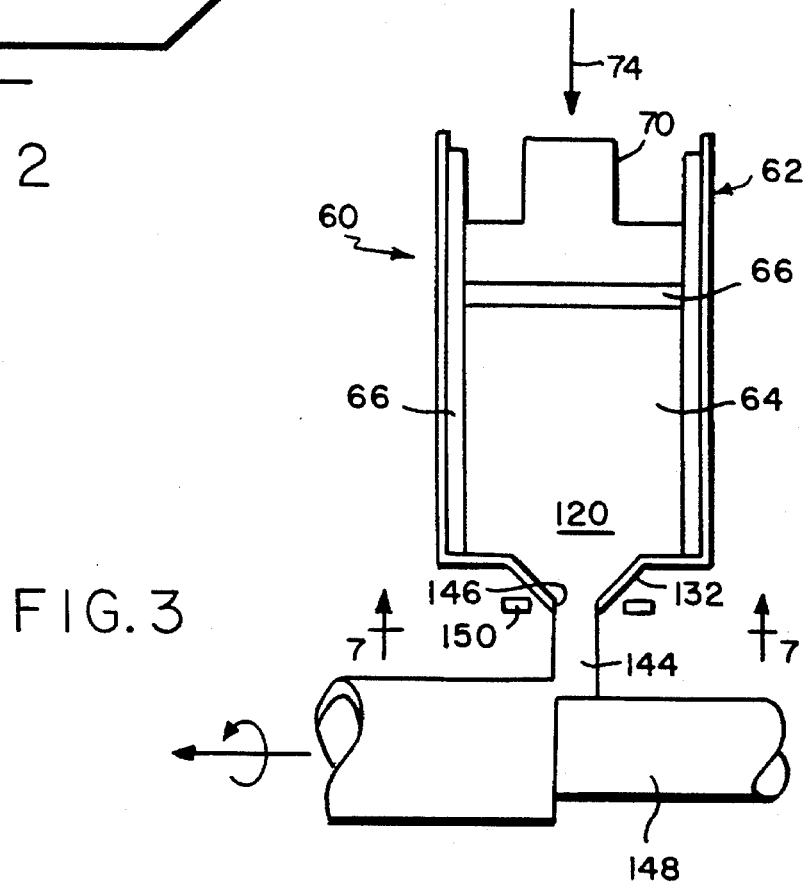
FIG. 3 is a schematic, sectional view of a batch process slurry source in accordance with another exemplary embodiment of the present invention.

While FIG. 2 depicts a continuous process slurry source 18, FIG. 3 depicts a schematic, sectional view of a batch process slurry source 60 in accordance with another exemplary embodiment of the present invention. Source 60 includes a vessel such as sleeve 62 sized and configured to receive therein a heated metal billet 64. Disposed between the billet 64 and the sleeve 62 is a layer of thermal insulation 66, for example, ceramic. The billet 64 is disposed in sleeve 62 between a nozzle 132 located at a proximal end thereof and an actuator 70 located at a distal end thereof. An additional layer of thermal insulation 66 may be disposed between the actuator 70 and the billet 64. The source 60 may further include an induction heater 150 disposed proximate an orifice 146 of the nozzle 132.

Billet 64 may be produced in advance, for example by a continuous casting or similar operation in which the metal alloy is electromagnetically or mechanically sheared during cooling to provide the desirable, rounded particle microstructure sought for use with the apparatus of this invention. Other techniques for producing the desired microstructure include reheating fine grained alloys and providing alloys formed by spray deposition or alloys that have been previously deformed. Accordingly, as a need arises, a billet 64 may be reheated externally to the sleeve 62 to its transition temperature or a predetermined temperature within the equilibrium freezing range of the alloy, as the case may be, thereby producing a partially solidified metal or metal slurry 120, which is then loaded into the sleeve 62. A cartridge (not depicted) may be used to facilitate the external heating and transfer of the billet 64. The billet 64 alternatively may be reheated to the semi-solid state within the sleeve 62 or otherwise within the source 60. Instead of or in addition to the insulation 66, the sleeve 62 may be preheated to prevent premature cooling and excessive solidification of the slurry 120 in the sleeve 62. Source 60 could also include a temperature or heat flux control system similar to that discussed with respect to source 18. The actuator 70 is then displaced longitudinally within the sleeve 62, as shown by arrow 74, to dispense the slurry 120 through the nozzle orifice 146 onto a substrate 148. In an exemplary embodiment, the actuator 70 includes a conventional hydraulic control system (not depicted) for controlling the displacement thereof; however, any of a variety of actuation systems including pneumatic, mechanical and electromechanical may be employed and are considered within the scope of the invention. As with the continuous source 18, the induction heater 150 of the batch source 60 is utilized to dynamically control the solid fraction and therefore rheology of the dispensed slurry 144 as it is dispensed from the nozzle 132. Both discrete transition temperature materials and equilibrium freezing range materials may be utilized in either continuous source 18 or batch source 60 with appropriate heat flux or temperature controls as discussed hereinabove.

For purposes of illustration, substrate 48 is depicted in FIG. 2 as having a planar surface; whereas, substrate 148 is depicted in FIG. 3 as having a contoured surface, in this particular embodiment cylindrical. As should be appreciated, these distinctions are for purposes of illustration of the broad application of the teachings of the invention and, as will become apparent, are not to be construed to be restrictive to the particular process source with which the substrate is depicted.

Figure 4:
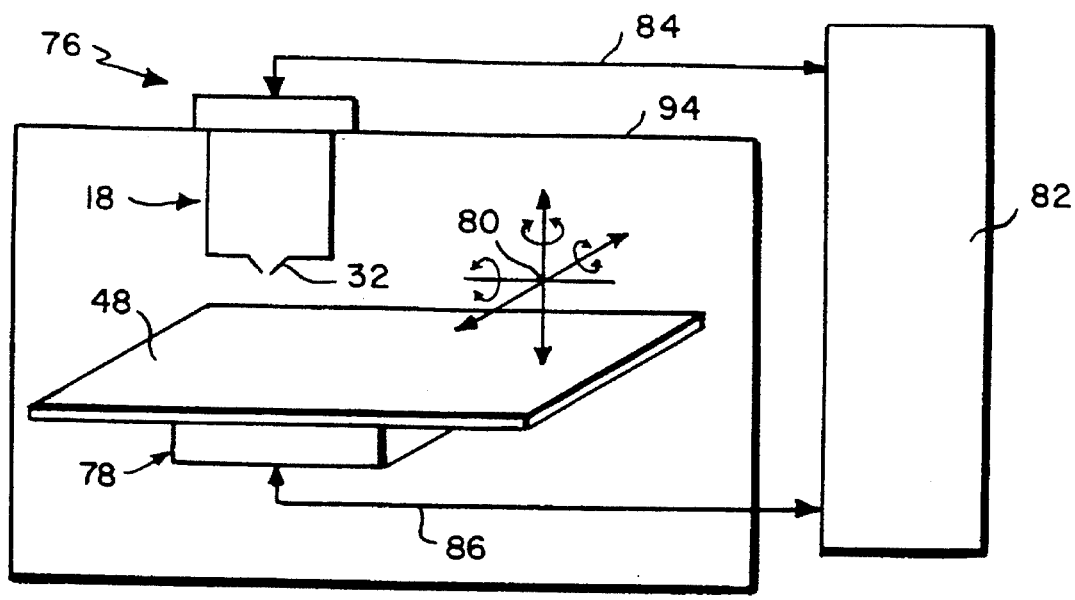
FIG. 4 is a schematic system block diagram according to an exemplary embodiment of the present invention.

By controlling dispensation of slurry 20 from the source 18 and relative movement between the source nozzle 32 and substrate 48, a component of predetermined geometry may be produced either from dispensed slurry 44 dispensed solely upon the substrate 48 or alternatively upon the substrate 48 and previously dispensed slurry 44. FIG. 4 depicts a schematic system 76 in block diagram form for producing a component according to an exemplary embodiment of the present invention. System 76 includes a slurry source 18 having a nozzle 32; a substrate 48 supported on a relative movement system 78 for effecting relative movement between the nozzle 32 and substrate 48 along one or more of a plurality of linear and rotational axes, shown generally at 80; and a controller 82 for controlling various process and movement control parameters. Process control link 84 disposed between controller 82 and source 18 may typically include process control power and sensor signal lines dedicated to source temperature or heat flux control systems, external induction heating, slurry shearing and volumetric flow rate control. Movement control link 86, disposed between controller 82 and relative movement system 78 may typically include movement control power and sensor signal lines dedicated to coordinate movement along one or more degrees of freedom of motion of axes 80, as desired. By coordinating process control and movement control in a predetermined manner, controller 82 is capable of producing a desired component either entirely of dispensed slurry 44, or in combination with other preexisting elements as will be discussed below.

Beyond process and movement control capabilities, controller 82 may be configured to advantageously function as a computer aided design (CAD) workstation, affording the capability liar an operator to produce computer models of a desired component. Additional computer aided manufacturing (CAM) functionality may also be provided to permit reconfiguration of the CAD component file into executable commands for controlling the relative movement system 78 as is conventionally known by those having skill in the art of CAD/CAM.

It should be noted that relative movement between the source 18 and substrate 48 may be accomplished in a variety of ways by configuring the system 76 in a preferred manner. For example, the relative movement system 78 may include a conventional XYZ table affording controlled motion along three linear, mutually orthogonal axes or degrees of freedom. This portion of the system may be disposed between the substrate 48 and ground. The relative movement system 78 may also include additional rotary degrees of freedom disposed between the source 18 and ground. The choice and allocation of degrees of freedom to the source 18 and substrate 48 may be selected so as to facilitate production of a desired component or style of component, for example prismatic or cylindrical. Configuration of the system 76 may further be selected to accommodate issues regarding relative size of a component with respect to the source 18, orifice size, volumetric flow rate and the like. For example, where a relatively large component is being produced, it may be more desirable to move the source 18 and leave the component stationary; whereas, in producing a relatively small component, the opposite may be desirable. Any or all degrees of freedom, therefore, may be allocated to either the source 18 or substrate 48 and often, several alternative schemes of allocation may be available to produce a desired component as the following examples will demonstrate.

Figure 5:
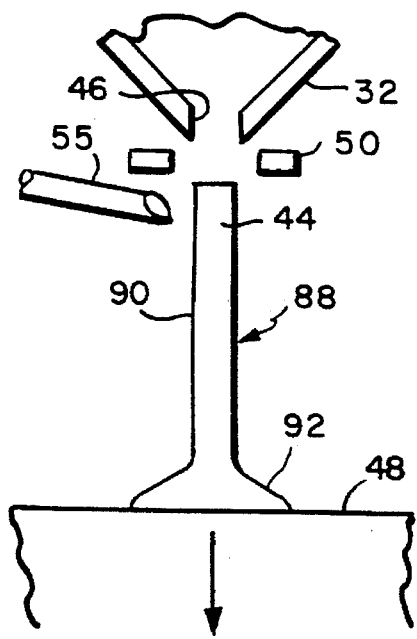
FIG. 5 is a schematic, side view of a component produced according to an exemplary method of the present invention.

The following two examples of producing a similar near net-shape component will be useful for further explaining allocation of axes as well as the flexible nature of the system 76. Recall the exhaust valve discussed above which may be conventionally cast or forged into a near-net form. FIG. 5 depicts a schematic side view of a similar exhaust valve 88 produced according to an exemplary method of the present invention. In this embodiment, the valve 88 is produced by a single, substantially continuous flow of dispensed slurry 44 in a vertical direction, as depicted in FIG. 5.

Due to the geometry of the valve 88, the nozzle orifice 46 is chosen to have a circular cross-section with a diameter slightly greater than that of the cylindrical valve stem 90. Sufficient excess material is provided to permit finish machining of the stem 90 to ensure proper assembly in an engine. The valve 88 is produced in the orientation depicted by initially positioning the nozzle 32 proximate the substrate 48. Upon initiation of flow through the nozzle 32, the nozzle 32 and substrate 48 are separated or retracted relative to one another in a controlled manner by the relative movement system 78 under control of the controller 82. Initially, the retraction rate is slow relative to the volumetric flow rate through the nozzle 32, causing an agglomeration of dispensed slurry 44 on the substrate 48. Sufficient material is dispensed so as to provide an adequate material envelope for subsequent machining therefrom of a valve head 92. Thereafter, the nozzle 32 is retracted at a linear rate substantially corresponding to the linear discharge rate of slurry 20 through the nozzle 32, where the linear discharge rate may be calculated as the quotient of the volumetric flow rate through the orifice 46 and the cross-sectional area of the orifice 46. In this manner, the stem 90 is uniformly produced. The solid fraction or temperature of the slurry 20 in the source 18 may be predetermined in combination with the retraction rate so that upon dispensation, dispensed slurry 44 cools sufficiently to provide support to the dispensed slurry 44 being deposited thereon. One or more cooling jets 55 of gas or liquid coolant may be directed at the dispensed slurry 44 upon dispensation from the nozzle orifice 46 to facilitate cooling and full solidification thereof if desired.

In general, the nozzle 32 is maintained proximate the desired deposition area to maximize geometric control of dispensed slurry 44; however, unsupported lengths of nonsolidified dispensed slurry 44 are achievable, if desired, and dependent primarily upon the apparent viscosity of the slurry 20. At a critical length, however, the weight of the unsupported dispensed slurry 44 causes the dispensed slurry to tear.

In the case where a slurry 20 is employed with a relatively high apparent viscosity, for example to ensure proper formation of the stem 90, the initially dispensed slurry 44 may be too resistant to flow to readily produce the desired material envelope for the valve head 92. In this situation, formation of the valve head 92 may be facilitated by initially energizing the induction heater 50 to slightly raise the bulk temperature of the initially dispensed slurry 44 resulting in the desirable slurry flow for this portion of the valve 88. Upon contact with the relatively cool substrate 48, the dispensed slurry 44 solidifies sufficiently to support the stem 90 being formed thereon. In this particular example, the induction heater may not be energized during formation of the stem 90.

Once a desired overall height has been reached, the valve 88 may be separated from the flow of dispensed slurry 44 by terminating flow from the source 18 by any means discussed hereinabove. Alternatively, rapid retraction of the nozzle 32 from the valve 88 beyond the self-supporting length of the dispensed slurry 44 will cause a tear, thereby achieving a similar result. Valve 88 could therefore be produced with a system 76 having a relative movement system 78 with solely one linear degree of freedom of movement between the substrate 48 and nozzle 32, either of which could be fixed to ground.

Figure 6:
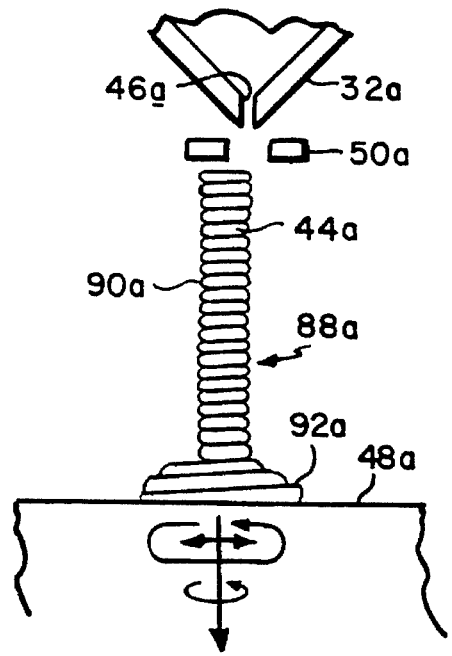
FIG. 6 is a schematic, side view of the component of FIG. 5 produced according to an alternate exemplary method of the present invention.

FIG. 6 is a schematic, side view of a near net-shape exhaust valve 88a similar to valve 88 depicted in FIG. 5 produced according to an alternate exemplary method of the present invention. Instead of producing valve 88 with a single, linear stroke, valve 88a is produced with a substantially continuous spiral of dispensed slurry 44a.

In this embodiment, nozzle 32a has an orifice 46a with a diameter less than about half of the diameter of valve stem 90a. Valve 88a is produced in the orientation depicted by initially positioning the nozzle 32a proximate the substrate 48a. Upon initiation of flow through the nozzle 32a, the nozzle 32a and substrate 48a are moved relative to one another in a controlled manner by the relative movement system 78 under control of the controller 82, with the dispensed slurry 44a being initially deposited upon the substrate 48a. The pattern produced may be a continuous spiral from a center of the valve head 92a to a maximum outer diameter thereof or simply a circle corresponding thereto. Either incrementally, as the outer diameter is completed, or uniformly, as the outer diameter is formed, the nozzle 32a is retracted relative to the substrate 48a and a subsequent layer of dispensed slurry 44a is deposited thereon. Each subsequent layer is positioned properly upon previously dispensed slurry 44a to create a valve 88a having the appropriate external contour and sufficient material envelope tier subsequent finish machining.

Periodically, as fabrication proceeds, the nozzle 32a may be offset to provide dispensed slurry 44a directly to a hollow, internal cavity being formed by the spiral layering. In this manner, the hollow component is filled resulting in a fully dense valve 88a. In order to facilitate filling, induction heater 50a may be selectively energized when dispensing into the hollow to reduce the solid fraction of the dispensed slurry 44, thereby ensuring complete flow and preventing material voids. The dispensed slurry 44 may be heated so as to be substantially in the liquid state if desired. Alternately, the entire outer spiral layering may be completed with subsequent filling thereof. Once a desired overall height has been reached, the valve 88a may be separated from the flow of dispensed slurry 44a as discussed above.

Valve 88a could be produced with a system 76 having a relative movement system 78 with solely three linear degrees of freedom of movement between the substrate 48a and nozzle 32a, two providing for circular motion within a plane parallel to substrate 48a and a third perpendicular thereto for providing retraction. Alternately, valve 88a could be produced with a relative movement system 78 having a rotary degree of freedom, to facilitate forming each circular layer, and two linear degrees of freedom, one providing for diametral size of each circular layer and the other providing for retraction.

In the example valve 88a depicted in FIG. 6, it is desirable that dispensed slurry 44 being deposited on previously dispensed slurry 44 causes limited surface melting of the previously dispensed slurry 44 along areas of contact thereby resulting in melt fusion of the layers. In this manner, the valve 88a comprises a near-net form component of unitary fabrication without interfaces. Sectioning of components produced by this method verify this capability. The method underlying the embodiment illustrated in FIG. 6 may be used to produce piping or tubing possessing arbitrary three dimensional cross sections and of arbitrarily complex shapes. Translation and rotation of the substrate 48a along one or more translational and rotational degrees of freedom permits fabrication of highly complicated piping or tubing and may be particularly useful for producing pipe fittings requiring unique shapes or flowpaths.

Whether a component is produced in either the manner depicted in FIG. 5 or FIG. 6, or in any other manner within the scope of the invention, it may be desirable to control the environment into which the slurry 20 is dispensed. FIG. 4 depicts an environmental enclosure 94 which may at least partially enclose the nozzle 32 and substrate 48. By controlling the environment therein, formation of potentially detrimental surface conditions on a component produced by the method of this invention may be obviated. For example, a ferrous alloy slurry may be dispensed into an environment having a reducing or inert atmosphere to prevent oxide formation. Such a technique may be particularly advantageous when producing a component according to the method of FIG. 6 where oxides may interfere with adhesion of subsequent layers of dispensed slurry 44a. Additionally, this technique may be desirable when the component will be used, at least in part, in the as-produced form. As stated hereinabove, the resulting component may be readily utilized in a particular application in a manner similar to that of components produced by conventional means such as casting and forging. The capability to produce fully dense components from slurry materials in this manner is readily distinguishable from the capability of known methods of rapid prototyping which produce solely a geometric mimic of the desired component, generally having properties unsuitable for operational use in the desired application.

Instead of or in addition to modifying the chemical composition of the atmosphere within the enclosure 94, temperature and/or absolute pressure therein may be controlled in a predetermined advantageous manner. By controlling temperature within an interior volume of the enclosure 94, dispensed slurry cooling rate may be increased or reduced, for example, to control microstructure of the component or to control the rate of slurry solidification to maintain geometric stability, especially in the case where the component has a relatively large volume relative to surface area. Absolute pressure within the enclosure 94 may also be controlled to fully or partially regulate volumetric flow rate of slurry 20 through the nozzle 32. Further, oxide formation can be prevented by dispensing the slurry 20 into a vacuum and cooling rate may be modified by dispensing the slurry into a partial vacuum. Control of the environment within enclosure 94 may be afforded by controller 82 through appropriate interface with thermal, pressure/vacuum and chemical sources (not depicted) via process control link 84.

As stated above, system 76 may produce components by deposition of dispensed slurry 44 upon a substrate 48 or upon previously dispensed slurry 44. FIG. 5 depicts use of a substantially planar substrate 48 which facilitated production of the exhaust valve 88; however, other components sought to be produced may benefit from production upon nonplanar, contoured substrates. For example, referring once again to FIG. 3, dispensed slurry 144 is being deposited upon a cylindrical substrate 148 having both rotary and linear translational degrees of freedom of motion. In this manner, an annular component may be readily produced. For a particular application which requires bridging of a void or creation of an overhang with dispensed slurry 44 otherwise unable to fully support its weight prior to further solidification, filler materials such as refractory sand or ceramic powders could be dispensed through cooling jet 55 or other apparatus onto the substrate or into the void under the control of controller 82 to provide temporary support to the dispensed slurry 44. Filler materials may remain within the void or be removed thereafter to create an empty cavity if desired.

Further, it should be appreciated that the invention is not limited to use of a nozzle 132 having an orifice 146 with a circular cross-sectional area as depicted in FIG. 7A. Any of a variety of orifice configurations may be employed to facilitate production of a particular component. For example, FIG. 7B depicts a nozzle 232 having an annular orifice 246, a centrally disposed blocker 232a being supported by radially disposed legs 232b. Nozzle 232 may be used to produce a tubular component having, for example, linear, arcuate or other predetermined contouring. FIG. 7C depicts a nozzle 332 having an orifice 346 with a substantially rectangular cross-sectional area which may find advantageous application in combination with the rotating translating substrate 148 depicted in FIG. 3. Nozzle 332 may also be useful in producing valve 88a of FIG. 6 providing both a more uniform external contour as well as stable planar surfaces for deposition of each subsequent layer of dispensed slurry 44a. Any of a variety of orifice shapes may be employed including those used for the direct production of substantially linear lengths of common stock such as I beam, L channel or railroad rail.

It should also be noted that the orifice 46 in the nozzle 32 need not be centrally disposed therein, nor need the nozzle 32 be oriented such that the dispensed slurry 44 is dispensed upon the substrate 48 in a perpendicular orientation as generally depicted. Depending on the configuration of the component being produced and the coordinated movements executed to produce the component, nonperpendicular angled deposition of dispensed slurry 44 may be advantageous. Further, size of the nozzle orifice 46 may be variable, being subject to adjustment or change either manually or automatically under the control of controller 82, for example.

In order to prevent the potential for inadvertent blockage of a nozzle 32 by the rounded solidified particles of alloy in the slurry 20, it is desirable that the orifice have a minimum dimension perpendicular to slurry flow of at least about 250 microns. This dimension corresponds to the equivalent of about five diameters of the average particle size for a typical metal alloy. Naturally, orifice size should accommodate any larger ceramic particles, fibers or other material if such matter is included in the slurry 20.

The system 76 is capable of producing a broad range of component sizes. For example, volumetric deposition rates may range from values of less than 0.1 in$^3$/min, corresponding to a 0.01 in$^2$ area nozzle orifice 46 dispensing slurry 20 at a linear rate of about 10 in/min, to values greater than 50,000 in$^3$/min, corresponding to a 100 in$^2$ area nozzle orifice 46 dispensing slurry 20 at a linear rate of about 500 in/min. Linear deposition rates may range from values of less than 0.1 in/min to values greater than 6000 in/min. Obviously, at higher volumetric and linear deposition rates, both the source 18 and relative movement system 78 must respectively be sized and configured to accommodate the demand for slurry 20 and the output of dispensed slurry 44. The substrate 48 need also be configured to support the size and weight of the component produced thereon.

As stated hereinabove, the teachings of this invention are applicable to a wide variety of metals, alloys and intermetallics including substantially all compositions exhibiting an equilibrium freezing range wherein temperature is controlled and those exhibiting a transition temperature wherein heat flux is controlled. Aluminum alloys systems are readily processed due to the relatively low liquidus temperatures exhibited thereby, producing light weight, high strength components. Further, both metal matrix composites and ceramic matrix composites may be advantageously processed by this system 76.

In addition to being capable of producing a component entirely from dispensed slurry 44, system 76 is also capable of producing a component comprised of dispensed slurry 44 and one or more additional elements. By way of example, FIG. 8 depicts a schematic, perspective view of a first element, in this case a plate 96a, being joined to a second element, plate 96b, by a bead of dispensed slurry 44 from source 18. The dispensed slurry 44 is being dispensed in a groove 98 formed between the two plates 96a, 96b. By coordinating volumetric flow rate of the dispensed slurry 44 and translation of the source with respect to the plates 96a, 96b, a single unitary plate 96 may be produced upon complete solidification of the dispensed slurry 44. Clearly, additional elements could be joined to plate 96 in a similar manner. To facilitate adhesion and bonding between the elements and the dispensed slurry 44, plates 96a, 96b, or solely portions thereof, may be preheated within the environmental enclosure 94 depicted in FIG. 4 or otherwise prior to slurry deposition thereon. The plates 96a, 96b may be of similar or dissimilar material and geometry.

Yet further, system 76 may be utilized to produce a component in combination with a single element. For example, dispensed slurry 44 may be deposited upon an element in a layer or other predetermined, controlled manner to increase a dimension such as thickness or height thereof. Such a technique is especially advantageous in the repair of worn or damaged components where a distressed portion of the component is removed by machining or other method and the missing material replaced by dispensed slurry 44. Due to the capability of system 76 to dispense relatively large amounts of material rapidly, a fully dense repair is readily achievable. System 76 could also be employed to fill voids in castings or other components as desired. The entire element, or solely a portion thereof, may be preheated within the enclosure 94 or otherwise, as desired, to facilitate adhesion.

While there have been described herein what are considered to be preferred embodiments of the present invention, other modifications of the invention will be apparent to those skilled in the art from the teaching herein. It is therefore desired to be secured in the appended claims all such modifications as fall within the true spirit and scope of the invention. Accordingly, what is desired to be secured by Letters Patent of the United States is the invention as defined and differentiated in the following claims.

I claim:

1. An apparatus for producing a component at least in part from partially solidified metal slurry, said apparatus comprising:

a source of said slurry;

a nozzle through which said slurry is dispensed;

a substrate upon which dispensed slurry is at least partially deposited, at least one of said substrate and said nozzle movable relative to the each other in at least two degrees of freedom; and a controller for controlling relative movement between said nozzle and said substrate to produce the component.

2. The apparatus according to claim 1 wherein:

said source comprises a temperature controlled vessel comprising:

a molten zone for providing molten material; and a transformation zone wherein said molten material is partially solidified prior to dispensation through said nozzle.

3. The apparatus according to claim 2 further comprising:

means for controlling a solid fraction of said dispensed slurry, said solid fraction control means being disposed proximate said nozzle.

4. The apparatus according to claim 3 wherein:
said solid fraction control means comprises an induction heater.

5. The apparatus according to claim 1 or 2 further comprising:
means for providing shearing of material disposed in said transformation zone.

6. The apparatus according to claim 5 wherein:
said shearing means comprises an electromagnetic field.

7. The apparatus according to claim 5 wherein:
said shearing means comprises a rotor.

8. The apparatus according to claim 1 wherein:
said substrate comprises a planar surface.

9. The apparatus according to claim 1 wherein:
said substrate comprises a contoured surface.

10. The apparatus according to claim 1 wherein:
said nozzle comprises an orifice of substantially circular cross section.

11. The apparatus according to claim 10 wherein:
said orifice has a diameter equal to at least about 250 microns.

12. The apparatus according to claim 1 wherein:
said nozzle comprises an orifice of non-circular cross section.

13. The apparatus according to claim 12 wherein:
said orifice has a minimum dimension equal to at least about 250 microns.

14. The apparatus according to claim 1 further comprising:
means for controlling dispensation of said partially solidified metal slurry through said nozzle.

15. The apparatus according to claim 14 wherein:
said dispensation control means comprises a valve disposed in flow communication with said nozzle.

16. The apparatus according to claim 14 wherein:
said dispensation control means comprises means for solidifying said slurry in said nozzle.

17. The apparatus according to claim 16 wherein:
said slurry solidifying means comprises a coolant in heat transfer relation with said nozzle.

18. The apparatus according to claim 1 further comprising:
an enclosure at least partially enclosing said nozzle and said substrate.

19. The apparatus according to claim 1 wherein:
said source comprises a vessel comprising:
a sleeve configured to receive a partially solidified material therein, said sleeve being in flow communication with said nozzle; and
an actuator disposed in said sleeve for controlling dispensation of said material through said nozzle when said billet is in a partially solidified material slurry state.

20. The apparatus according to claim 19 further comprising:
means for controlling temperature of said material in said nozzle.

21. The apparatus according to claim 19 further comprising:
means for controlling heat flux of said material in said nozzle.

22. The apparatus according to claim 19 further comprising:
means for providing thermal insulation disposed between said billet and at least a portion of said vessel.

23. The apparatus according to claim 19 further comprising:
means for controlling a solid fraction of said dispensed slurry, said solid fraction control means being disposed proximate said nozzle.

24. The apparatus according to claim 23 wherein:
said solid fraction control means comprises an induction heater.

25. The apparatus according to claim 19 further comprising:
means for controlling dispensation of said partially solidified material slurry through said nozzle.

26. The apparatus according to claim 25 wherein:
said dispensation control means comprises means for controlling relative movement between said actuator and said nozzle.

27. The apparatus according to claim 26 wherein:
said controller comprises a hydraulic control system.

28. A method for producing at least a portion of a near net-shape component from partially solidified metal slurry comprising the steps of:
providing said slurry;
dispensing said slurry through a nozzle and onto a substrate; and
shaping said portion of said component by moving said nozzle relative to said substrate in at least two degrees of freedom.

29. The method according to claim 28 wherein:
the step of providing said slurry comprises the steps of:
providing a source of molten material; and
simultaneously shearing and cooling at least a portion of said molten material to a temperature between a solidus and a liquidus thereof.

30. The method according to claim 28 wherein:
the step of providing said slurry comprises the steps of:
providing a source of molten material; and
simultaneously shearing and controlling heat flux of at least a portion of said molten material at a transition temperature thereof.

31. The method according to claim 28 wherein:
dispensing of said slurry occurs substantially continuously during production of at least a portion of said component.

32. The method according to claim 28 wherein:
the step of providing said metal slurry comprises the steps of:
providing a metal billet; and
controlling temperature of said metal billet within a temperature range between a solidus and a liquidus thereof.

33. The method according to claim 28 wherein:
the step of providing said metal slurry comprises the steps of:
providing a metal billet; and
controlling heat flux of said metal billet at a transition temperature thereof.

34. The method according to claim 28 further comprising the step of:
providing a temperature controlled environment within which dispensed slurry is deposited.

35. The method according to claim 28 further comprising the step of:
providing an environment having a predetermined chemical composition within which dispensed slurry is deposited.

36. The method according to claim 28 further comprising the step of:

provi ding an absolute pressure controlled environment within which dispensed slurry is deposited.

37. The method according to claim 28 further comprising the step of:

controlling a solid fraction of said dispensed slurry prior to deposition of said dispensed slurry upon said substrate or upon previously dispensed slurry.

38. The method according to claim 37 wherein:

said solid fraction of said dispensed slurry is reduced to facilitate filling, at least in part, a cavity of said component.

39. The method according to claim 28 wherein:

dispensing of said slurry occurs discontinuously during production of at least a portion of said component.

40. The method according to claim 39 wherein:

said discontinuous dispensing is effected by actuation of a valve disposed in flow communication with said nozzle.

41. The method according to claim 39 wherein:

said discontinuous dispensing is effected by solidifying said slurry in said nozzle.

42. The method according to claim 39 wherein:

said discontinuous dispensing is effected by displacement of an actuator disposed in said source.

\* \* \* \* \*

UNITED STATES PATENT AND TRADEMARK OFFICE
CERTIFICATE OF CORRECTION

PATENT NO. : 5,622,216
DATED : 4/22/97
INVENTOR(S) : Stuart B. Brown

It is certified that error appears in the above-identified patent and that said Letters Patent is hereby corrected as shown below:

Column 1, line 21: after "forming", please insert --or-- therefor.

Column 2, line 16: please delete "retorted"; and insert --referred-- therefor.

Column 6, line 33: please delete "traction"; and insert --fraction-- therefor.

Column 9, line 30: please delete "liar"; and insert --for-- therefor.

Column 11, line 25: please delete "tier"; and insert --for--- therefor.

Column 12, line 55: please delete "mariner" and insert --manner-- therefor.

Signed and Sealed this

Eighth Day of December, 1998

Attest:

Attesting Officer

BRUCE LEHMAN

Commissioner of Patents and Trademarks